July 1, 1930.                    C. J. DUNZWEILER                    1,768,751
STORAGE BATTERY
Filed Sept. 23, 1925
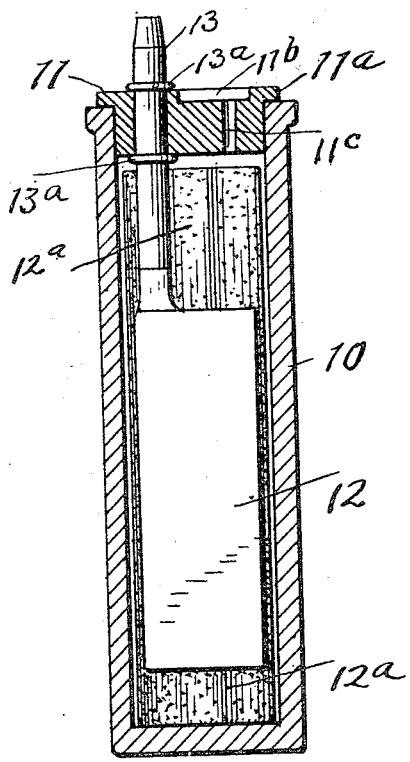
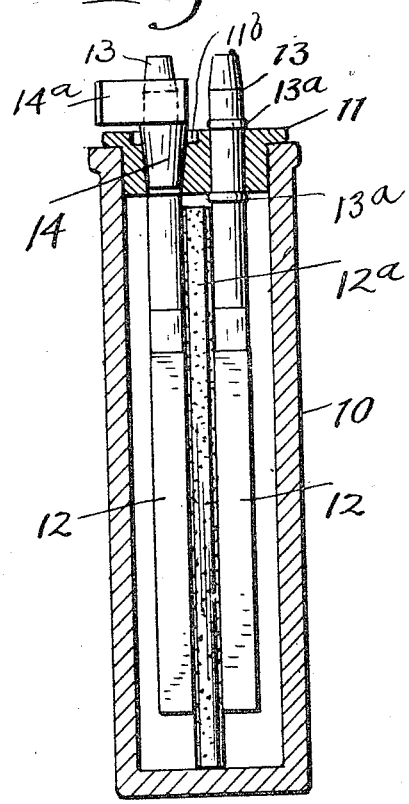
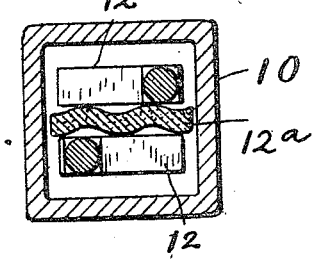
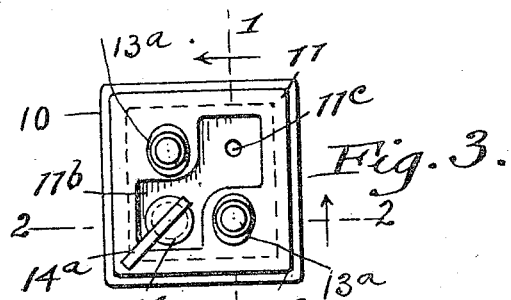
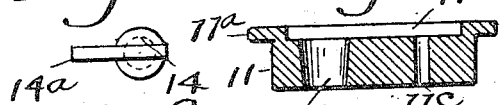
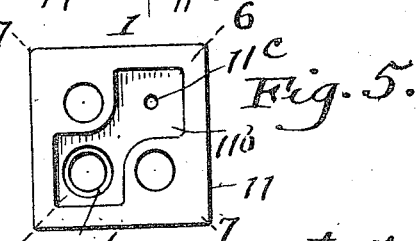
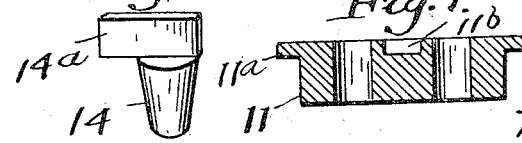
Inventor.
Carl J. Dunzweiler
Rives Hudson & Kent
attys Patented July 1, 1930

1,768,751

UNITED STATES PATENT OFFICE

CARL J. DUNZWEILER, OF CLEVELAND, OHIO, ASSIGNOR TO WILLARD STORAGE BATTERY COMPANY, OF CLEVELAND, OHIO, A CORPORATION OF WEST VIRGINIA

STORAGE BATTERY

Application filed September 23, 1925. Serial No. 58,053.

This invention relates to storage batteries, and particularly to small battery constructions, such, for example, as may be employed advantageously in "B" radio batteries.

One of the objects of the invention is to provide a battery which is simple in construction, inexpensive to manufacture and easily assembled.

A further object is to provide an improved cover construction with the plates of the battery element supported by the cover, with provision for definitely locating the terminal posts in the cover so that the plates will be supported at the right height in the jar, and at the proper distance from the bottom thereof.

A further object is to provide certain improvements in the plug for the filling opening, the specific object being to render it more convenient to remove or replace the plugs, particularly when a large number of cells, such as herein shown, are serially connected by cross-connectors in the well-known manner.

The invention may be briefly summarized as consisting in certain novel details of construction, and combinations and arrangements of parts which will be described in the specification and set forth in the appended claims.

In the accompanying sheet of drawings wherein I have illustrated the preferred construction, Fig. 1 is a vertical sectional view substantially along the line 1—1 of Fig. 3, looking in the direction indicated by the arrows; Fig. 2 is a vertical sectional view substantially along the line 2—2 of Fig. 3, looking in the direction indicated by the arrows; Fig. 3 is a plan view; Fig. 4 is a transverse sectional view; Fig. 5 is a top plan view of the cover removed from the jar; Fig. 6 is a transverse sectional view substantially along the line 6—6 of Fig. 5; Fig. 7 is a sectional view substantially along the line 7—7 of Fig. 5; Fig. 8 is a top plan view of the filling plug; and Fig. 9 is a perspective view of the same.

Referring now to the drawings, 10 represents a jar formed of insulating material, preferably glass. In this instance the jar is of rectangular cross-section, as is preferred.

The cover 11 is also formed of insulating material, and preferably of semi-hard rubber. It is of rectangular shape, having a body portion which fits friction tight in the top of the jar 10, and a flange $11^a$ which extends over and rests on the top of the jar.

The battery element consists of positive and negative plates 12, (one of each) and a suitable insulator $12^a$ between them. The latter may be, and preferably is supported from the bottom of the jar, but the plates are supported from the cover by reason of the fact that the terminal posts 13 of the plates extend through and are tightly fitted in the cover. They fit sufficiently tight in the cover to form an effective seal against leakage of battery solution.

In order that the plates may be supported at the desired height in the jar 10, the posts are provided immediately above and below the cover with protuberances or flanges $13^a$, the distance between these protuberances being equal to the thickness of the cover, so that when the cover is fitted over the post, the lower protuberance will engage its lower surface and the upper protuberances will engage its upper surface. The cover has sufficient flexibility that it can be forced down over the upper protuberances.

The terminal post openings of the cover are preferably located adjacent two opposite corners of the cover, as shown in the plan view, and between the terminal post openings the cover is provided with an elongated and irregularly shaped depression $11^b$, and extending through the cover near the ends of the depression and adjacent the two other opposite or diagonally disposed corners of the cover are a small vent opening $11^c$ and a relatively large filling opening $11^d$.

The vent opening is open at all times, but the filling opening is normally closed by a tapered plug 14 which normally fits friction tight in the filling opening, the latter having a tapered inner wall, as illustrated.

The filling plug 14 is provided at the top with a wing $14^a$, which as shown, projects laterally from the plug, forming a handle portion which is designed to be grasped between the thumb and index finger when the plug is being removed or restored; by providing this lateral extension at the top of the plug, the latter can be readily removed without serious interference by the cross-connectors which connect the posts of the different cells. As the cells are small and grouped closely together, the cross-connectors have interfered with the removal and restoration of the plugs, but this disadvantage is largely overcome by the present construction.

By locating the terminal post openings near diagonally opposite corners of the cover, or in the relatively thick portion thereof, and by providing between the corner portions through which the posts are adapted to extend, the depressed part from which the vent and filling openings extend, it will be obvious that if any electrolyte should find its way to the top of the cover it will be retained in the depression $11^b$ and will run back into the cell.

I do not desire to be confined to the precise details shown, but aim in my claims to cover all modifications which do not involve a departure from the spirit and scope of my invention.

Having described my invention, I claim:

1. A storage battery comprising a jar having a cover frictionally fitted into the top of the jar, plates supported by the cover and having terminal posts tightly fitted in the cover and extending through the same adjacent diagonally opposite corners thereof, the cover having a depressed part between the terminal posts, and one or more openings extending therethrough from the base of the depression.

2. A storage battery comprising a jar having a cover and provided with plates with terminal posts extending through the cover, a depression adjacent said posts, the cover having a filling opening at one end of the depression and extending therethrough, a friction plug normally closing the opening and provided with a handle portion projecting laterally beyond the side of the plug and a vent opening at the other end of said depression.

3. A storage battery comprising a jar having a cover provided with a substantially flat under surface, plates in the jar having terminal posts extending upwardly through the cover adjacent opposite corners thereof, the cover having a diagonally disposed depression lying between said posts the bottom thereof being substantially parallel with the under surface of said cover, and an opening extending through the base of said depression.

In testimony whereof, I hereunto affix my signature.

CARL J. DUNZWEILER.